US007487269B2

(12) United States Patent
Clark et al.

(10) Patent No.: US 7,487,269 B2
(45) Date of Patent: *Feb. 3, 2009

(54) APPARATUS, SYSTEM, AND METHOD OF CONNECTION GROUPING FOR MULTIPATH LOCK FACILITY CONNECTION PATHS

(75) Inventors: Brian Dow Clark, Tucson, AZ (US); Juan Alonso Coronado, Tucson, AZ (US); Beth Ann Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 339 days.

This patent is subject to a terminal disclaimer.

(21) Appl. No.: 10/992,561

(22) Filed: Nov. 18, 2004

(65) Prior Publication Data

US 2006/0106964 A1 May 18, 2006

(51) Int. Cl.
*G06F 3/00* (2006.01)

(52) U.S. Cl. ............................ 710/38; 710/36; 710/37; 710/104; 710/109; 710/200; 710/220; 709/238; 711/100

(58) Field of Classification Search ............. 710/36–38, 710/39, 200, 213, 238, 239, 310, 312, 316, 710/8–14, 104, 109, 220; 348/231.2, 231.3, 348/231.9; 709/238; 711/100
See application file for complete search history.

(56) References Cited

U.S. PATENT DOCUMENTS 6,088,757 A * 7/2000 Boonie et al. ............... 710/200
6,185,650 B1 * 2/2001 Boonie et al. ............... 710/200
6,253,274 B1 * 6/2001 Boonie et al. ............... 710/200
6,304,980 B1 10/2001 Beardsley et al. .............. 714/6
6,704,812 B2 3/2004 Bakke et al. .................. 710/38
6,766,359 B1 * 7/2004 Oliveira et al. ............. 709/213
6,983,330 B1 * 1/2006 Oliveira et al. ............. 709/239
7,127,545 B1 * 10/2006 Nandi et al. ................ 710/316
2003/0016624 A1 1/2003 Bare .......................... 370/217
2003/0021233 A1 1/2003 Fabre et al. .............. 370/238.1
2004/0128386 A1 7/2004 Oomoto et al. ............. 709/226

OTHER PUBLICATIONS

Business Wire news article, “EMC wins $6.9 million sale to Galileo International; World's largest computerized travel reservations provider uses EMC Symmetrix computer storage systems to process 2,000 reservations per second”, Oct. 30, 1995.*

* cited by examiner

*Primary Examiner*—Tariq Hafiz
*Assistant Examiner*—Jonathan R Plante
(74) *Attorney, Agent, or Firm*—Kunzler & McKenzie

(57) ABSTRACT

An apparatus, system, and method are disclosed for grouping connection paths for lock attention data. A grouping request module is included to receive a request to establish a group of connection paths. Each connection path is configured to communicate lock attention data between a host and a control unit. The control unit is configured to control a storage device containing data accessible to a plurality of processes. A connection path selection module is included to select a plurality of connection paths between the host and the control unit and a grouping assignment module configured to assign the plurality of connection paths to a group. In one embodiment, an attention selection module is included to select an attention connection path for communicating lock attention data from any of the connection paths in the group. The attention selection module may select an attention connection path using a load balancing function.

12 Claims, 6 Drawing Sheets

500
502 Begin
504 Receive a Request to Establish a Group of Connection Paths
506 Select a Connection Path
508 Max Connection Paths Selected? No / Yes
510 Assign the Selected Connection Paths to a Group
512 Lock Attention Data to Transmit? No / Yes
514 Poll a Connection Path in the Group for Availability and Traffic
516 All Connection Paths Polled? No / Yes
518 Select a Connection Path from the Group
520 Transmit Lock Attention Data
522 End

APPARATUS, SYSTEM, AND METHOD OF CONNECTION GROUPING FOR MULTIPATH LOCK FACILITY CONNECTION PATHS

BACKGROUND OF THE INVENTION

1. Field of the Invention

This invention relates to grouping connection paths and more particularly relates to creating a connection path group for lock attention data.

2. Description of the Related Art

A transaction processing system such as an airline reservation system, a credit card transaction processing system, an automatic teller machine system, or the like typically comprises a plurality of host systems or hosts such as mainframe computers, servers, and the like. The hosts access data in a common data storage location. The data store typically includes a plurality of storage devices such as hard disk drives, data caches, and the like. The hosts may access the data in the storage devices through a control unit. For example, a first host may request data from the control unit, and the control unit may retrieve the data from one or more storage devices. The first host may also transmit data to the control unit, and the control unit may write the data to one or more storage devices.

Each host communicates with the control unit through a channel path. Each channel path typically includes one or more physical communication channels such as a digital electronic communication bus, a digital optical communication bus, or a similar communication channel. In addition, each connection path may include one or more logical control blocks, addresses, communication devices, digital switches, and the like for coordinating the transmission of digital messages between the host and the control unit.

Before the first host accesses data through the control unit, the first host typically requests that the data be locked. For example, the first host may request that specified data such as one or more rows in a data table, one or more tracks of a hard disk drive, or the like be locked. If the first host is granted the lock, the first host may access the specified data without a second host being allowed access the specified data. The first host has exclusive access to the specified data until the first host releases the lock. For transactions such as airline reservations, credit card transactions, or similar transactions, a locking function is designed to allow a transaction with a first host to be completed before a second host can access the transaction data.

If the second host requests a lock on the specified data while the first host holds the lock on the specified data, the second host will be not receive the lock and will become a waiter. Instead the second host's lock request will be placed in a lock request queue. The second host may wait to process transactions until receiving the lock. After the first host has released the lock on the data, the control unit grants the next lock request in the lock request queue for the specified data. For example, after the first host releases the lock, the control unit may grant a lock on the specified data to the second host if the second host's request is the next request in the lock request queue. The control unit notifies the second host that the lock has been released by transmitting lock attention data. The lock attention data may take on different forms depending on the status of the lock. The lock attention message may provide information that the lock has been granted or may provide a lock contention message. The lock attention message may provide lock status information. One skilled in the art will recognize other appropriate lock attention data. Upon receipt of the lock attention data granting the lock, the second host may access the specified data.

Current systems provide lock attention data on a single connection path. This attention connection path is the only connection path for transmitting lock attention data unless the attention connection path is unassigned and another connection path is assigned through a reconfigure command. Reconfiguration to switch from one attention connection path to another may be time consuming. With a single connection path between a host and the control unit, if the connection path fails the host will not receive the lock attention data granting the host a lock on the specified data. As a result, the host will not access the specified data and release the lock on the specified data for another host. The host may not receive the lock attention data until the failed connection path is discovered and an alternate connection path is established. Until the alternate connection path is established, the lock request queue may continue to grow as additional hosts or processes within a host request locks on the specified data. Each requesting host or process may be idle while waiting for the lock attention data granting the lock on the specified data, slowing the performance of the transaction processing system. In addition, if the lock request queue grows to a sufficient length, the transaction processing system may require an extreme recovery action such as rebooting the system to allow transaction processing to resume.

Even when a single connection path for attention data is functioning, the single connection path may be a communications bottleneck, slowing the system due to device loading, hardware inefficiencies or errors, or any number of problems or traffic limitations. A single connection path for attention data may not take advantage of other connection paths that are functioning more efficiently or are not busy.

From the foregoing discussion, it should be apparent that a need exists for an apparatus, system, and method for grouping connection paths for lock attention data to allow selection of any of the available connection paths in a group. Beneficially, such an apparatus, system, and method would allow selection of a connection path that is functioning and available rather than relying on a single connection path for attention data that may be slow or may not be functioning.

SUMMARY OF THE INVENTION

The present invention has been developed in response to the present state of the art, and in particular, in response to the problems and needs in the art that have not yet been fully solved by currently available connection paths to transmit lock attention data. Accordingly, the present invention has been developed to provide an apparatus, system, and method for grouping connection paths for lock attention data that overcome many or all of the above-discussed shortcomings in the art.

The apparatus to group connection paths for lock attention data is provided with a logic unit containing a plurality of modules configured to functionally execute the necessary steps of defining a group of connection paths, each of which may be used to transmit lock attention data between a host and a control unit. These modules in the described embodiments include a grouping request module that receives a request to establish a group of connection paths. Each connection path is configured to communicate lock attention data between a host and a control unit. The control unit is configured to control a storage device containing data accessible to a plurality of processes. The apparatus includes a connection path selection module that selects a plurality of connection paths between the host and the control unit and a grouping assignment module that assigns the plurality of connection paths to a group.

The apparatus, in one embodiment, includes an attention selection module that selects an attention connection path for communicating lock attention data from any of the connection paths in the group. In another embodiment, the attention selection module selects an attention connection path using a load balancing function. The load balancing function may include selecting a least busy connection path within the group as the attention connection path. In another embodiment, load balancing function may include selecting a functioning communication channel as the attention connection path.

In one embodiment, the plurality of connection paths in the group may be used to transmit transaction data when not being used to transmit lock attention data. In one embodiment, the lock attention data may be transmitted using Transaction Processing Facility ("TPF") software. In another embodiment, the lock attention data is part of a Multi-Path Lock Facility ("MPLF"). In yet another embodiment, the control unit is part of a storage control unit or data storage system such as an International Business Machine ("IBM") Enterprise Storage Server ("ESS"), an EMC Symmetrix, or a Hitachi Lightning.

In an alternate embodiment, an apparatus for grouping connection paths for lock attention data may be configured to include a grouping request sending module that sends a request to establish a group of connection paths from a host to a control unit. Each connection path is configured to communicate lock attention data between the host and the control unit. The control unit controls at least one storage device containing data accessible to a plurality of processes. The apparatus includes a group assignment receiving module that receives a group of connection paths from the control unit. The control unit is configured to select a plurality of connection paths configured to transmit lock attention data between the host and the control unit and to assign the plurality of connection paths to the group of connection paths. In another embodiment, the apparatus includes an attention receiving module that receives lock attention data from the control unit on an attention connection path selected from any of the connection paths in the group using a load balancing friction.

A system of the present invention is also presented to group connection paths for lock attention data. The system may be embodied by at least one host, at least one storage module, and a control unit in communication with the host or hosts and the one or more storage modules. The system includes a grouping request module that receives a request to establish a group of connection paths. Each connection path is configured to communicate lock attention data between a host and the control unit. The control unit is configured to control at least one storage device containing data accessible to a plurality of processes. The system includes a connection path selection module that selects a plurality of connection paths between the host and the control unit and a grouping assignment module configured to assign the plurality of connection paths to a group. In particular, the system, in one embodiment, includes an attention selection module that selects an attention connection path for communicating lock attention data from any of the connection paths in the group.

The attention selection module may further include selecting an attention connection path using a load balancing function. In one embodiment, the lock attention data is transmitted using Transaction Processing Facility ("TPF") software. In another embodiment, the control unit is part of a data storage system.

A method of the present invention is also presented for grouping connection paths for lock attention data. The method in the disclosed embodiments substantially includes the steps necessary to carry out the functions presented above with respect to the operation of the described apparatus and system. In one embodiment, the method includes receiving a request to establish a group of connection paths. Each connection path is configured to communicate lock attention data between a host and a control unit. The control unit is configured to control a storage device containing data accessible to a plurality of processes. The method includes selecting a plurality of connection paths between the host and the control unit and assigning the plurality of connection paths to a group. The method also may include selecting an attention connection path for communicating lock attention data from any of the connection paths in the group.

In a further embodiment, selecting an attention connection path further includes selecting an attention connection path using a load balancing function. In another embodiment, the load balancing function includes selecting a least busy connection path within the group as the attention connection path. In yet another embodiment, the load balancing function includes selecting a functioning communication channel as the attention connection path. In one embodiment, the plurality of connection paths in the group may be used to transmit transaction data when not being used to transmit lock attention data.

In another embodiment, a method for deploying computing infrastructure is included for integrating computer-readable code into a computing system, wherein the code in combination with the computing system is capable of performing receiving a request to establish a group of connection paths, selecting a plurality of connection paths between the host and the control unit, and assigning the plurality of connection paths to a group. Each connection path is configured to communicate lock attention data between a host and a control unit and the control unit is configured to control a storage device containing data accessible to a plurality of processes. In one embodiment, the method includes selecting an attention connection path for communicating lock attention data from any of the connection paths in the group.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
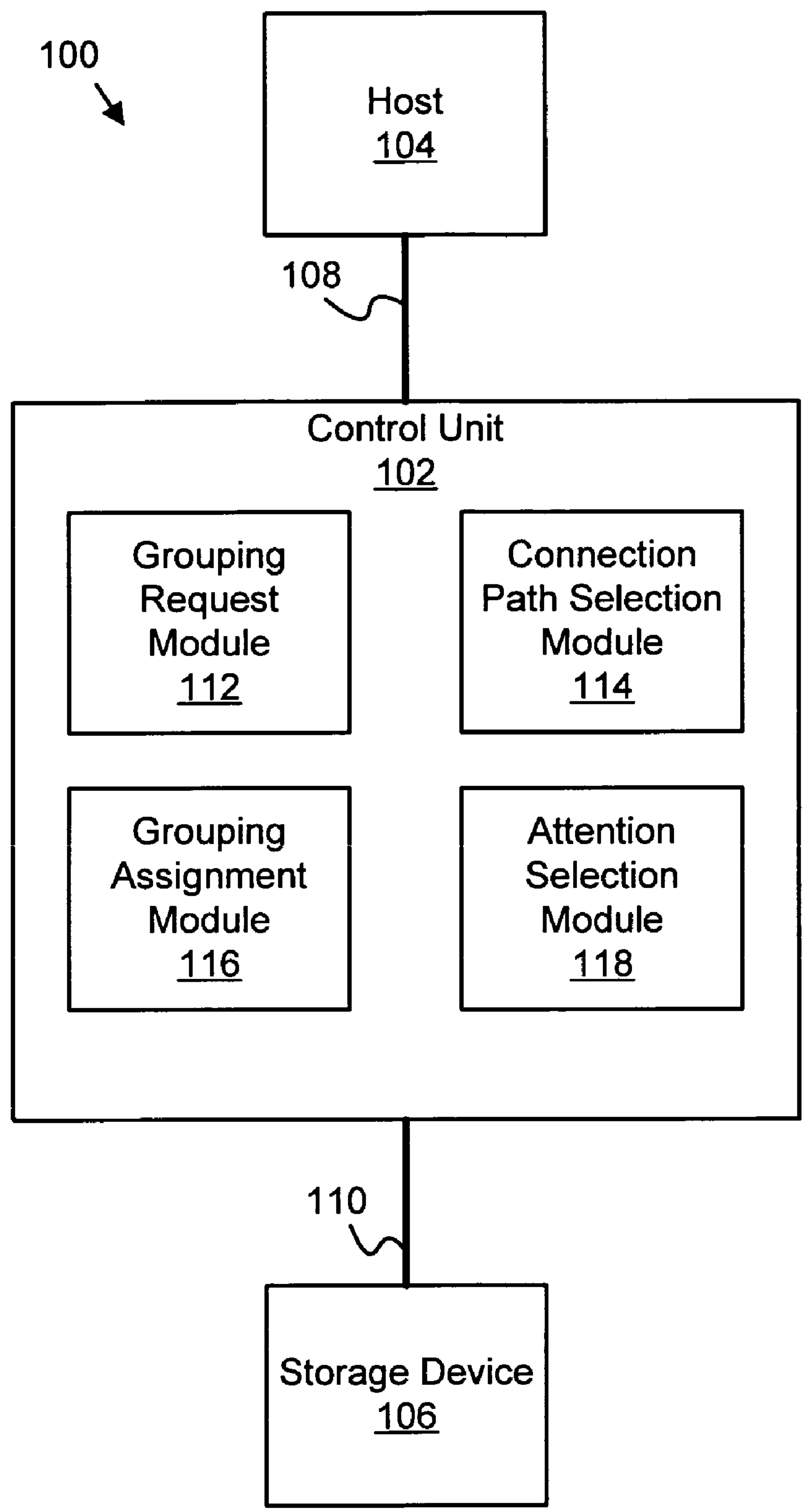
FIG. 1 is a schematic block diagram illustrating one embodiment of a system to group connection paths for lock attention data in accordance with the present invention.

FIG. 1 depicts schematic block diagram illustrating one embodiment of a system 100 to group connection paths for lock attention data in accordance with the present invention. The system 100 includes a control unit 102 configured to communicate with one or more hosts 104 and one or more storage devices 106. The control unit 102 is configured to process requests from a host 104, or one or more processes within a host 102, to access data in a storage unit 106. The control unit 102 may be a storage controller connected to a network or a storage area network. In one embodiment, the control unit 102 is a data storage control system. In another embodiment, the control unit 102 is an Enterprise Storage Server ("ESS") manufactured by International Business Machines ("IBM") of Armonk, N.Y. One skilled in the art will recognize other embodiments of a control unit 102 that facilitates access of data on a storage device 106 by a host 104.

The host 104 reads data from and writes data to the storage device 106 through the control unit 102. The host 104 may be a mainframe computer, a server, a personal computer, or the like. In a certain embodiment, the host is an IBM mainframe computer running the z/390 or z/OS operating system. The control unit 102 accesses the data of the storage device 106 for the host 104.

In one embodiment, the host 104 processes transactions comprising data. A transaction may require that data accessed during the transaction is locked during the transaction to prevent corruption of the data. For example, a transaction involving transferring money may require that a source account and a destination account be locked to prevent access by another process until the transfer of money is complete. In one embodiment the system 100, employs IBM's Transaction Processing Facility ("TPF") operating system. The system 100 may use IBM's Multi-Path Lock Facility to lock data during a transaction.

The storage device 106 may be one or more hard disk drives, a redundant array of independent drives, an optical storage drive, a magnetic tape drive, a data cache, or the like. In one embodiment, the control unit 102 accesses a plurality of storage devices 106. In one embodiment, the storage device 106 may be integrated with the control unit 102.

The host 104 communicates with the control unit 102 through a connection path. Each connection path comprises at least one communication channel 108. In addition, each connection path may comprise one or more logical ports, control blocks, switches, addresses, and the like for transmitting digital messages between the host 104 and the control unit 102. In one embodiment, each communication channel 108 is configured as a physical communication channel such as a digital electronic communication bus, a digital optical communication bus, or the like. Each communication channel 108 transmits digital messages between the host 104 and the control unit 102.

The control unit 102 communicates with the storage device 106 through a storage connection path. Each storage connection path comprises at least one storage communication channel 110. In addition, each connection path may comprise one or more logical ports, control blocks, switches, addresses, and the like for transmitting digital messages between the control unit 102 and the storage device 106. In one embodiment, each storage communication channel 110 is configured as a physical communication channel such as a digital electronic communication bus, a digital optical communication bus, or the like. In another embodiment, the storage communication channel 110 comprises a storage area network. In yet another embodiment, the storage communication channel 110 is a small computer system interface ("SCSI") bus. Each storage communication channel 110 transmits digital messages between the control unit 102 and the storage device 106.

The control unit 102 includes a grouping request module 112 configured to receive a request to establish a group of attention data connection paths. Each attention data connection path is configured to communicate lock attention data between the host 104 and the control unit 102. In one embodiment, the lock attention data comprises notification to a host 104 that is a waiter that a lock on data sought by the host 104 is granted. In another embodiment, the lock attention data comprises a message to a second host 104 that a first host 104 is contending for the data and that the second host 104 is made a waiter. One skilled in the art will recognize other lock attention data that may be transmitted on an attention data connection path.

In one embodiment, the grouping request module 112 receives a request to establish a group of attention data connection paths from a host 104. The grouping request module 112 may also receive a request to establish a group of attention data connection paths from the control unit 102 or through user input during an initialization process. In another embodiment, the grouping request module 112 may receive a request to establish a group of attention data connection paths automatically during an initialization or other process. One skilled in the art will recognize other ways for the grouping request module 112 to receive a request to establish a group of attention connection paths.

The control unit 102 includes a connection path selection module 114 configured to select a plurality of connection paths between the host 104 and the control unit 102. The connection path selection module 114 selects connection paths that are capable of transmitting lock attention data. In one embodiment, the connection path selection module 114 may select connection paths that are unassigned. In another embodiment, the connection path selection module 114 may select connection paths that may also be used to transmit data other than lock attention data. In yet another embodiment, the connection path selection module 114 may select connection paths that are assigned to a group. One skilled in the art will recognize connection paths that the connection path selection module 114 may select to transmit lock attention data.

The control unit 102 includes a grouping assignment module 116 configured to assign the plurality of connection paths to a group. In one embodiment, the grouping assignment module 116 creates a table that identifies connection paths to transmit lock attention data. In another embodiment, the grouping assignment module 116 assigns a group identification to the group. In yet another embodiment, the grouping assignment module 116 notifies the host 104 that is in communication with the control unit 102 that the group has been created. In another embodiment, the grouping assignment module 116 communicates to the host 104 the connection paths in the group. One skilled in the art will recognize other ways for the grouping assignment module 116 to assign connection paths to a group.

The control unit 102 includes an attention selection module 118 configured to select an attention connection path for communicating lock attention data from any of the connection paths in the group. In one embodiment, the attention selection module 118 selects an attention connection path based on a load balancing function. The load balancing function may choose an attention connection path that is the least busy. The load balancing function may also either choose an attention connection path that is available to transmit lock attention data or exclude connection paths that are unavailable to transmit lock attention data. A connection path may be unavailable due to hardware failures, software failures, use of the connection path for another purposes, or the like. The load balancing function may, in one embodiment, use a combination of factors such as amount of traffic on a connection path, availability, efficiency of the connection path, or other factors to select an attention connection path. One skilled in the art will recognize other load balancing functions to select an attention connection path.

Currently, only one connection path between a host 104 and a control unit 102 is selected or initialized to transmit lock attention data. Currently, if the selected attention connection path is unavailable, hosts or processes accessing the same data may be forced to wait due to the unavailability of the attention connection path. The system 100 selects a group of connection paths to transmit lock attention data between a host 104 and a control unit 102. The system 100 may solve many or all of the problems of the current state of the art because any of a number of attention connection paths may be chosen to transmit attention data and transmission of lock attention data is no longer dependent on a single connection path.

The grouping request module 112, the connection path selection module 114, the grouping assignment module 116, and attention selection module 118, in one embodiment are located in the control unit 102, but maybe located in the storage device 106, in the host 104, or another computing device, or may not be located all in a single device. One skilled in the art will recognize other module locations configured to group connection paths for lock attention data.

Figure 2:
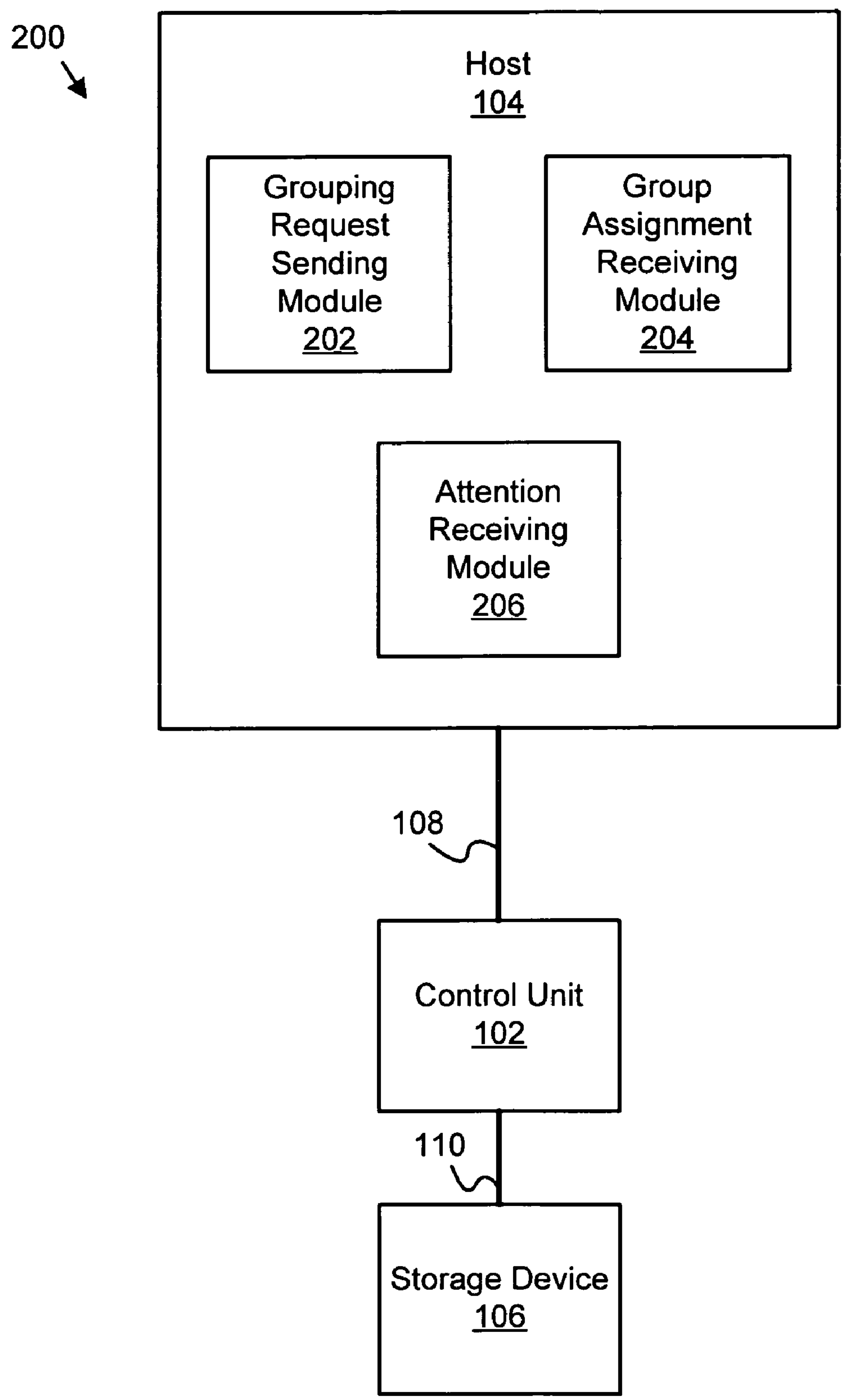
FIG. 2 is a schematic block diagram illustrating another embodiment of an apparatus to group connection paths for lock attention data in accordance with the present invention.

FIG. 2 is a schematic block diagram illustrating another embodiment of an apparatus 200 to group connection paths for lock attention data in accordance with the present invention. The apparatus 200 includes a control unit 102, a host 104, a storage device 106, a communication channel 108 from the host 104 to the control unit 102 and a storage communication channel 110 from the control unit 102 to the storage device 106 substantially as described above in connection with FIG. 1. The host 104 includes a grouping request sending module 202 configured to send a request to establish a group of connection paths from the host 104 to the control unit 102. Each connection path is configured to communicate lock attention data between the host 104 and control unit 102 via a communication channel 108. The control unit 102 is configured to communicate with the storage device 106 and access data on the storage device 106 via a storage communication channel 110.

The host 104 includes a group assignment receiving module 204 configured to receive a group of connection paths from the control unit 102. The control unit 102 is configured to select a plurality of connection paths configured to transmit lock attention data between the host 104 and the control unit 102 and to assign the plurality of connection paths to a group. The host 104 also includes, in one embodiment, an attention receiving module 206 configured to receive lock attention data from the control unit 102 on an attention connection path selected from any of the connection paths in the group. The attention connection path may be selected using a load balancing function.

Figure 3:
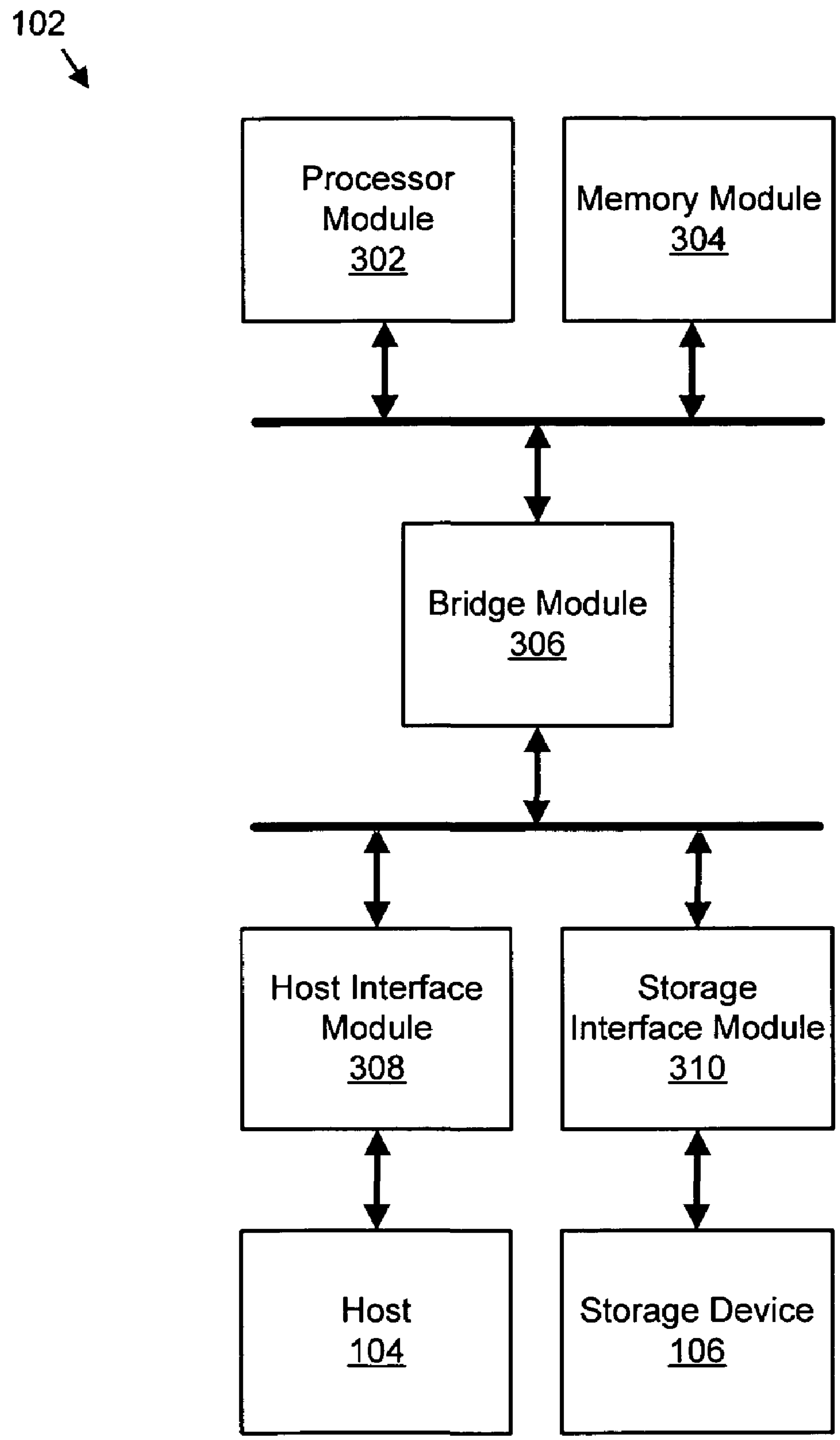
FIG. 3 is a schematic block diagram illustrating one embodiment of a control unit to group connection paths for lock attention data in accordance with the present invention.

FIG. 3 is a schematic block diagram illustrating one embodiment of a control unit 102 of the present invention. The control unit 102 includes a processor module 302, a memory module 304, a bridge module 306, a host interface module 308, and a storage interface module 310, a host 104, and a storage device 106.

The processor module 302, memory module 304, bridge module 306, host interface module 308, and storage interface module 310 may be fabricated of semiconductor gates on one or more semiconductor substrates. Each semiconductor substrate may be packaged in one or more semiconductor devices mounted on circuit cards. Connections between the processor module 302, the memory module 304, the bridge module 306, the host interface module 308, and the storage interface module 310 maybe through semiconductor metal layers, substrate to substrate wiring, or circuit card traces or wires connecting the semiconductor devices.

The memory module 304 stores software instructions and data. The processor module 302 executes the software instructions and manipulates the data as is well know to those skilled in the art. The processor module 302 communicates with the host interface module 308 and the storage interface module 310 through the bridge module 306.

In one embodiment, the grouping request module 112, the connection path selection module 114, the grouping assignment module 116, and attention selection module 118 are software programs comprising software instructions and data executing on the processor module 302.

For example, the processor module 302 executing the grouping request module 112 may receive a request to group connection paths for lock attention data between the control unit 102 and the host 104. In addition, the processor module 302 executing the connection path selection module 114 may select connection paths to transmit lock attention data, and the processor module 302 executing the grouping assignment module 116 may assign the selected connection paths to a group. The processor module 302 executing the attention selection module 118 may establish an attention connection path between the control unit 102 and the host 104 using a load balancing function through the host interface module 308 and the communication channel 108.

Figure 4:
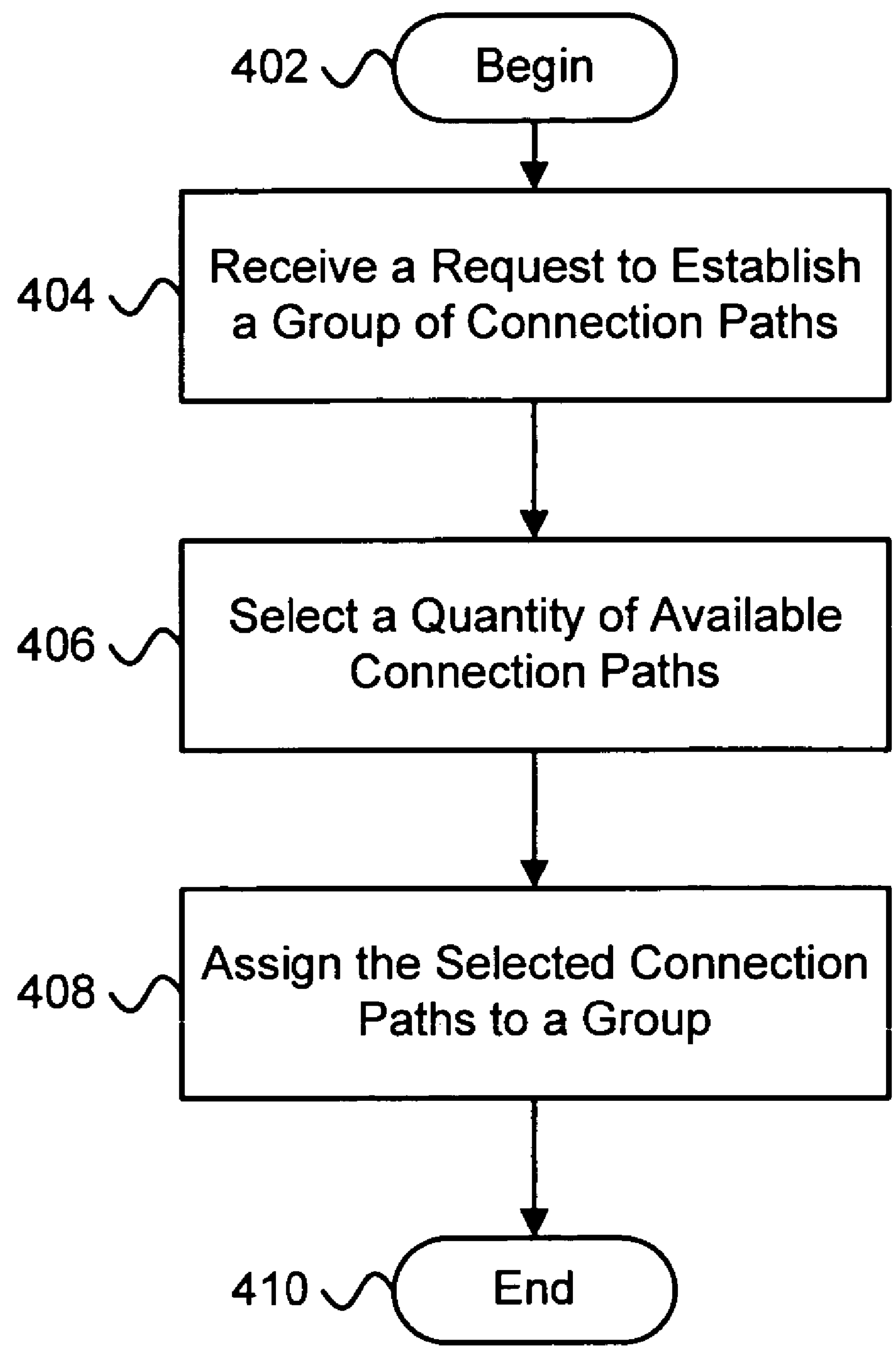
FIG. 4 is a schematic flow chart diagram illustrating one embodiment of a method for grouping connection paths for lock attention data in accordance with the present invention.

FIG. 4 is a schematic flow chart diagram illustrating one embodiment of a method 400 for grouping connection paths for lock attention data in accordance with the present invention. The method 400 begins 402 when the grouping request module 112 receives 404 a request to establish a group of connection paths configured to transmit lock attention data. The connection path selection module 114 then selects 406 a quantity of connection paths between the host 104 and control unit 102 that may be configured to transmit lock attention data. The grouping assignment module 116 then assigns 408 the selected connection paths to a group and the method 400 ends 410. In one embodiment, the grouping assignment module 116 notifies the host 104 of the group. In another embodiment, the grouping assignment module 116 creates a table representing the group that includes the connection paths in the group.

Figure 5:
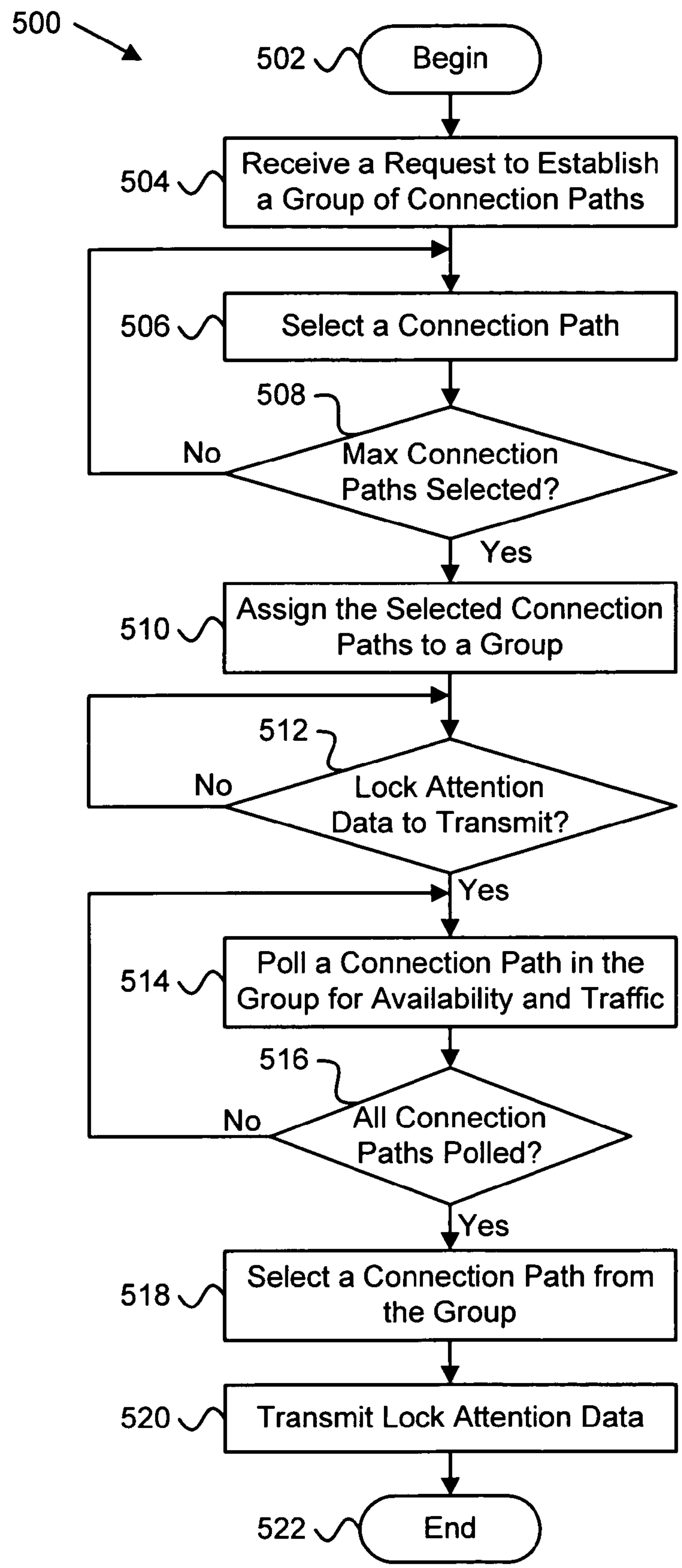
FIG. 5 is a schematic flow chart diagram illustrating another embodiment of a method for grouping connection paths for lock attention data in accordance with the present invention.

FIG. 5 is a schematic flow chart diagram illustrating another embodiment of a method 500 for grouping connection paths for lock attention data in accordance with the present invention. The method 500 begins 502 when the grouping request module 112 receives 504 a request to establish a group of connection paths configured to transmit lock attention data. The connection path selection module 114 then selects 506 a connection path that may be configured to transmit lock attention data. The connection path selection module 114 then determines 508 if a maximum number of connection paths has been reached. The maximum number of connection paths may be a pre-determined number of connection paths to be assigned to a group. If the connection path selection module 114 determines 508 that the maximum number of connection paths has not been reached, the method 500 returns and the connection path selection module 114 then selects another connection path. If the connection path selection module 114 determines 508 that the maximum number of connection paths has been reached, the grouping assignment module 116 assigns 510 the selected connection paths to a group.

The control unit 102 determines 512 if there is lock attention data to be transmitted to the host 104. If the control unit 102 determines 512 there is no lock attention data to be transmitted, the control unit 102 continues to process data. If the control unit 102 determines 512 that there is lock attention data to transmit, the attention selection module 118 polls 514 a connection path in the group to determine availability of the connection path and traffic on the connection path. The attention selection module 118 then determines 516 if all of the connection paths in the group have been polled. If the attention selection module 118 determines 516 there are more connection paths in the group to be polled, the attention selection module 118 polls 514 another connection path in the group. If the attention selection module 118 determines 516 there are no more connection paths in the group to be polled, the attention selection module 118 selects 518 an attention connection path from the group to transmit lock attention data between the host 104 and the control unit 102. The attention selection module 118 may select 518 an attention connection path using a load balancing function. The control unit 102 then transmits 520 the lock attention data and the method 500 ends 522.

Figure 6:
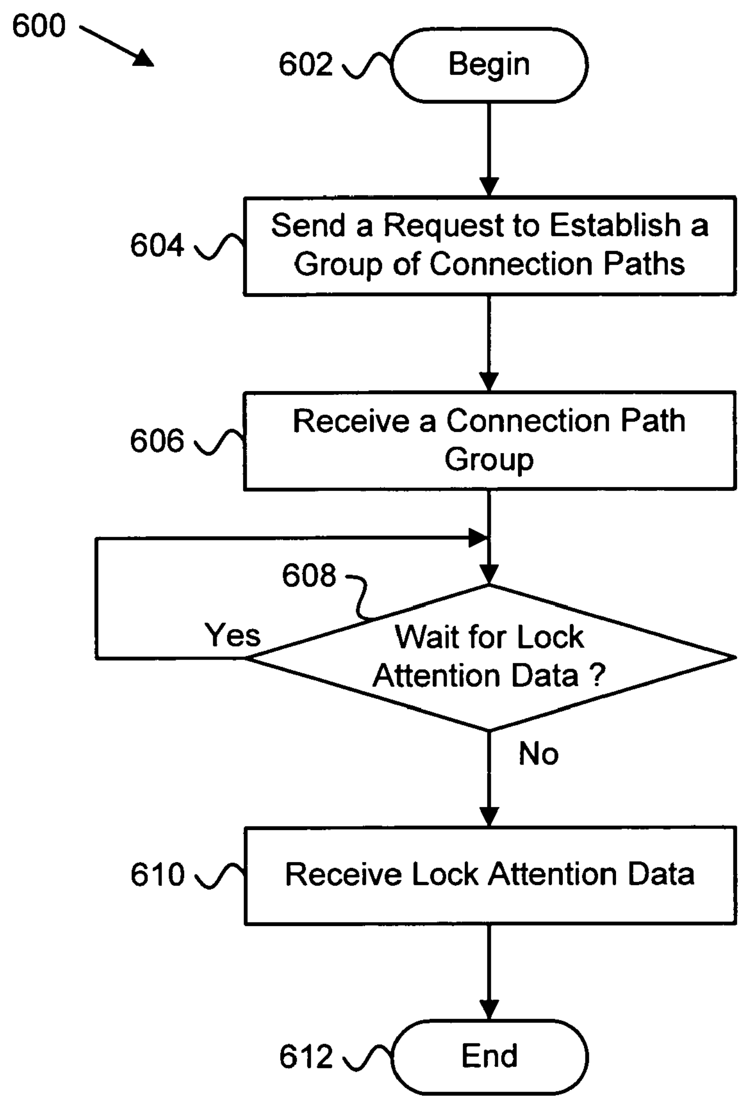
FIG. 6 is a schematic flow chart diagram illustrating yet another embodiment of a method for grouping connection paths for lock attention data in accordance with the present invention.

FIG. 6 is a schematic flow chart diagram illustrating yet another embodiment of a method 600 for grouping connection paths for lock attention data in accordance with the present invention. The method 600 begins 602 when the grouping request sending module 202 sends 604 a request to the grouping request module 112 to establish a group of connection paths for lock attention data. The group assignment receiving module 204 then receives 606 a group of connection paths for lock attention data. The attention receiving module 206 may then wait 608 for lock attention data to be transmitted. For example, if the host 104 is made a waiter, the attention receiving module 206 may wait 608 for a lock on data required for a transaction to be released. If lock attention data is transmitted to the host 104, the attention receiving module 206 then receives 610 the lock attention data and the method 600 ends 612.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, and computer readable storage medium being a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to group connection paths for lock attention data, the apparatus comprising:

a grouping request module comprising software instructions and data stored on a computer readable storage medium and executing on a processor and configured to receive a request to establish a group of connection paths wherein each connection path is a useable, physical connection path and is configured to communicate the lock attention data between a first host and a control unit and the connection paths in the group of connection paths are used to transmit transaction data when not being used to transmit the lock attention data, the lock attention data comprising a lock notification to the first host when the first host is granted a lock on data stored on hard disk drives and a wait message to the first host that the first host is made a waiter for the data stored on the hard disk drives when a second host is granted the lock, and the control unit is configured to control the hard disk drives containing the data accessible to a plurality of hosts;

a connection path selection module comprising software instructions and data stored on the computer readable storage medium and executing on the processor and configured to select a plurality of connection paths between the first host and the control unit;

a grouping assignment module comprising software instructions and data stored on the computer readable storage medium and executing on the processor and configured to assign the plurality of connection paths to the group of connection paths until a maximum number of connection paths is reached, create a table that identifies the connection paths of the group of connection paths, and assign a group identification to the group of connection paths; and an attention selection module comprising software instructions and data stored on the computer readable storage medium and executing on the processor and configured to serially poll the connection paths of the group of connection paths and dynamically select an attention connection path from the polled connection paths of the group of connection paths for communicating the lock attention data, wherein in the attention connection path is selected based on amount of traffic, availability, and efficiency.

2. The apparatus of claim 1, wherein the lock attention data is transmitted using a Transaction Processing Facility ("TPF").

3. The apparatus of claim 1, wherein the lock attention data is part of a Multi-Path Lock Facility ("MPLF").

4. The apparatus of claim 1, wherein the control unit is part of a data storage system.

5. A system to group connection paths for lock attention data, the system comprising:

a plurality of hosts;

at least one hard disk drive;

a control unit in communication with the plurality of hosts and the at least one hard disk drive;

a grouping request module comprising software instructions and data stored on a computer readable storage medium and executing on a processor and configured to receive a request to establish a group of connection paths wherein each connection path is a useable, physical connection path and is configured to communicate the lock attention data between the plurality of hosts and the control unit, the connection paths in the group of connection paths are used to transmit transaction data when not being used to transmit the lock attention data, and the control unit is configured to control the at least one hard disk drive containing the data accessible to the plurality of hosts, the lock attention data comprising a lock notification to a first host when the first host is granted a lock on the data stored on the at least one hard disk drive and a wait message to the first host that the first host is made a waiter for the data stored on the at least one hard disk drive when a second host is granted the lock;

a connection path selection module comprising software instructions and data stored on the computer readable storage medium and executing on the processor and configured to select a plurality of connection paths between the plurality of hosts and the control unit;

a grouping assignment module comprising software instructions and data stored on the computer readable storage medium and executing on the processor and configured to assign the plurality of connection paths to the group of connection paths until a maximum number of connection paths is reached, create a table that identifies the connection paths of the group of connection paths, and assign a group identification to the group of connection paths; and an attention selection module comprising software instructions and data stored on the computer readable storage medium and executing on the processor and configured to serially poll the connection paths of the group of connection paths and dynamically select an attention connection path from the polled connection paths of the group of connection paths for communicating the lock attention data, wherein in the attention connection path is selected based on traffic, availability, and efficiency.

6. The system of claim 5, wherein the lock attention data is transmitted using a Transaction Processing Facility ("TPF").

7. The system of claim 5, wherein the control unit is part of a data storage system.

8. A computer readable storage medium tangibly embodying a program of machine-readable instructions executable by a digital processing apparatus to perform operations to group connection paths for lock attention data, the operations comprising:

receiving a request to establish a group of connection paths wherein each connection path is a useable, physical connection path and is configured to communicate the lock attention data between a first host and a control unit, the connection paths in the group of connection paths are used to transmit transaction data when not being used to transmit the lock attention data, and the control unit is configured to control hard disk drives containing data accessible to a plurality of hosts, the lock attention data comprising a lock notification to the first host when the first host is granted a lock on the data stored on the hard disk drives and a wait message to the first host that the first host is made a waiter for the data stored on the hard disk drives when a second host is granted the lock;

selecting a plurality of connection paths between the plurality of hosts and the control unit;

assigning the plurality of connection paths to the group of connection paths until a maximum number of connection paths is reached;

creating a table that identifies the connection paths of the group of connection paths;

assigning a group identification to the group of connection paths;

serially polling the connection paths of the group of connection paths; and dynamically selecting an attention connection path from the polled connection paths of the group of connection paths for communicating the lock attention data, wherein in the attention connection path is selected based on traffic, availability, and efficiency.

9. The computer readable storage medium of claim 8, wherein the lock attention data is transmitted using a Transaction Processing Facility ("TPF").

10. The computer readable storage medium of claim 8, wherein the lock attention data is part of a Multi-Path Lock Facility ("MPLF").

11. The computer readable storage medium of claim 8, wherein the control unit is part of a data storage system.

12. A method for grouping connection paths for lock attention data, the method comprising:

deploying a connection path program stored on computer readable medium onto a computing system;

initiating execution on a processor of the computing system the connection path program comprising the steps of:

receiving a request to establish a group of connection paths wherein each connection path is a useable, physical connection path and is configured to communicate the lock attention data between a first host and a control unit and the connection paths in the group of connection paths are used to transmit transaction data when not being used to transmit the lock attention data, the lock attention data comprising a lock notification to the first host when the first host is granted a lock on data stored on hard disk drives and a wait message to the first host that the first host is made a waiter for the data stored on the hard disk drives when a second host is granted the lock, and the control unit is configured to control the hard disk drives containing the data accessible to a plurality of hosts;

selecting a plurality of connection paths between the plurality of hosts and the control unit;

assigning the plurality of connection paths to the group of connection paths until a maximum number of connection paths is reached;

creating a table that identifies the connection paths of the group of connection paths;

assigning a group identification to the group of connection paths;

serially polling the connection paths of the group of connection paths; and dynamically selecting an attention connection path from the polled connection paths of the group of connection paths for communicating the lock attention data, wherein in the attention connection path is selected based on traffic, availability, and efficiency.

* * * * *